United States Patent [19]

Tadashi et al.

[11] 4,104,665

[45] Aug. 1, 1978

[54] CONTACT MECHANISM OF SHUTTER FOR CAMERA

[75] Inventors: Nakagawa Tadashi; Masanori Watanabe; Eiichi Onda; Mitsuo Koyama; Ichiro Nemoto, all of Chiba, Japan

[73] Assignee: Seiko Koki Kabushiki Kaisha, Japan

[21] Appl. No.: 744,924

[22] Filed: Nov. 24, 1976

[30] Foreign Application Priority Data

Nov. 25, 1975 [JP] Japan ............................ 50-159497[U]

[51] Int. Cl.² .............................................. G03B 9/08
[52] U.S. Cl. ................................... 354/226; 354/147; 354/246
[58] Field of Search ............... 354/146, 147, 226, 245, 354/246, 248, 249, 266

[56] References Cited

U.S. PATENT DOCUMENTS

| | | |
|---|---|---|
| 3,945,026 | 3/1976 | Hayami .................................. 354/147 |
| 4,054,891 | 10/1977 | Onda et al. ............................ 354/246 |

Primary Examiner—John Gonzales
Attorney, Agent, or Firm—Robert E. Burns; Emmanuel J. Lobato; Bruce L. Adams

[57] ABSTRACT

A camera shutter mechanism comprises opening and closing members sequentially movable to open and closed positions to accordingly effect opening and closing of a shutter aperture to complete an exposure. The opening member engages with a contact member to move the contact member into electrical contact with a stationary contact member during movement of the opening member into its open position and the opening member returns to its initial position during the course of movement of the closing member to its closed position.

6 Claims, 7 Drawing Figures

CONTACT MECHANISM OF SHUTTER FOR CAMERA

BACKGROUND OF THE INVENTION

This invention relates to improvements in the contact mechanism of a shutter for a camera. Among contacts for ensuring an electrically conductive state during the exposure operation of a shutter, there are a synchronizing contact for making a flashing apparatus light, a holding contact for connecting the power supply of an electronic shutter to the network, etc.

In a shutter of the type which carries out the exposure operation with one set of shutter blades, it is relatively easy to structure the contact. In a shutter which carries out the exposure operation with two sets of shutter blades, on the other hand, it is necessary to arrange the contact so that it closes during the course of the opening operation and opens during the closing operation, resulting in rather complicated structure of said contact, limited space in arrangement, etc.

SUMMARY OF THE INVENTION

The principal object of this invention is to provide a shutter contact arrangement of simple structure for use with a shutter having two sets of shutter blades and the structure thereof consists fundamentally in an operation for opening and closing a contact member in response to movement of the opening member only, which after the completion of the closing operation returns towards the initial direction. Referring now to the accompanying drawings, the invention will be described in detail as follows.

DETAILED DESCRIPTION OF THE INVENTION

Figure 1:
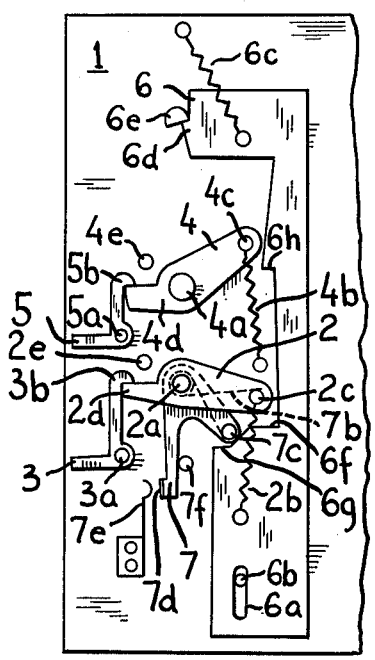
FIG. 1 is a plan view of a shutter in the state of charging, showing the first embodiment of the invention.

In FIG. 1 a shutter base plate 1 is provided with an exposure opening (not shown), on which various members to be described below are arranged. An opening member 2 is rotatably pivoted on a shaft 2a and has a pin 2c on which a spring 2b exerts a right-turning force biasing the member 2 in the clockwise direction in FIG. 1. A stop pin 2e is positioned to engage a projection 2d at the other end of the opening member 2. Said opening member 2 is interlocked with shutter blades (not shown) and is shown in the drawing in a first position wherein said shutter blades cover said opening. A hook member 3 for releasably locking said opening member 2 is rotatably pivoted on a shaft 3a, and is biased rightwardly by a right-turning spring (not shown) and a hook portion 3b locks said projection 2d of said opening member 2.

A closing member 4 is rotatably pivoted on a shaft 4a and has a pin 4c on which a right-turning spring 4b exerts a clockwise bias and is provided with a stop pin 4e which controls the operation of a projection 4d at the other end thereof. Said closing member 4 is interlocked with said shutter blades (not shown) and is show in the drawing in a second position wherein said shutter blades uncover said opening.

A hook member 5 for releasably locking said closing member 4 is rotatably pivoted on a shaft 5a and is biased rightwardly by a right-turning spring (not shown) and a hook portion 5b locks said projection 4d of said closing member 4.

An actuating member 6 is operatively supported on the base plate 1 by means of a fixed pin 6b slidably fitted in a slot 6a formed near the lower part of said member 6, said member 6 is pressed upwards and leftwards by a spring 6c and a hook portion 6d locks a fixed locking pin 6e. The actuating member 6 has a step portion 6f for locking with said pin 2c of said opening member 2, a step portion 6g succeeding said step portion 6f and a step portion 6h for locking with said pin 4c of sid closing member 4.

A contact member 7 is fitted on said shaft 2a of said opening member 2 and is pressed by a left-turning spring 7b and is provided with an upward-projecting pin 7c for releasably locking with said opening member 2.

One end of said contact member 7 is provided with an electric contact portion 7d, which forms a counterpart of a contact piece 7e which is electrically insulated and fixed in opposition thereto. Said contact member 7 is at rest in contact with a pin 7f. Now, the operation of the shutter according to this invention will be briefly described.

During the course of the release operation, said hook member 3 for said opening member 2 is turned to the left from the state shown in FIG. 1 whereby said hook portion 3b is unlocked from said projection 2d to enable turning of said opening member 2 to the right by said spring 2b. This turning of said opening member 2 shifts said shutter blades (not shown) from the first position covering said opening to the second one uncovering said opening and initiates the taking of the exposure.

Figure 2:
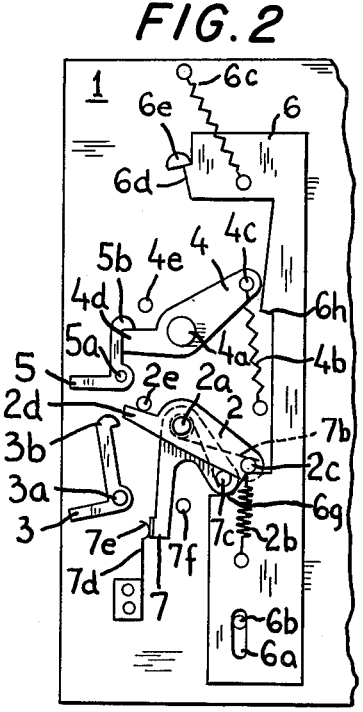
FIG. 2 is a plan view of the shutter in the state of opening.

In the region wherein the opening member 2 finishes its operation, said opening member 2 engages with said pin 7c of said contact member 7 to move said contact portion 7d of said contact member 7 into contact with said contact piece 7e and thereafter said projection 2d comes into contact with said pin 2e to complete the operation. FIG. 2 shows the state at this moment.

After the lapse of a desired exposure time by a well-known method (not shown in the drawing), said hook member 5b for said closing member 4 turns to the left to unlock said member 5b from said projection 4d whereupon said closing member 4 turns to the right by means of said spring 4b to shift said shutter blades (not shown) from the second position uncovering said shutter opening to the first one covering said opening to complete the exposure.

Figure 3:
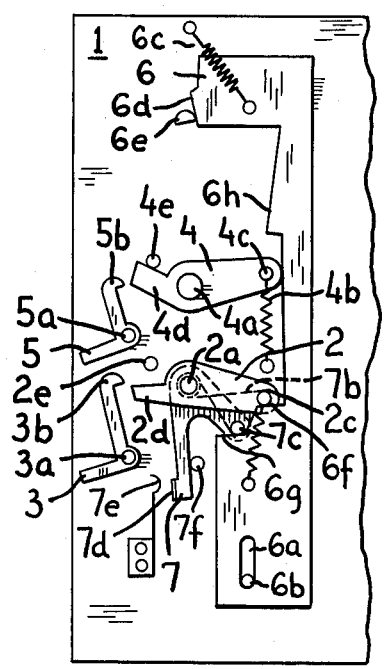
FIG. 3 is a plan view of the shutter in the state of the completed exposure operation.

In the region wherein the closing member 4 finishes its operation, said pin 4c engages with said step portion 6h to push rightwards said actuating member 6 against said spring 6c and to unlock said hook portion 6d from said pin 6e, so that said actuating member 6 is displaced upwards by said spring 6c. Upon engagement of said step portion 6f with said pin 2c and of said step portion 6g with said pin 7c, the state shown in FIG. 3 is realized.

Consequently, said shutter blades operated by said opening member 2 again return to said first position and said contact portion 7d comes out of contact with said contact piece 7e.

Figure 4:
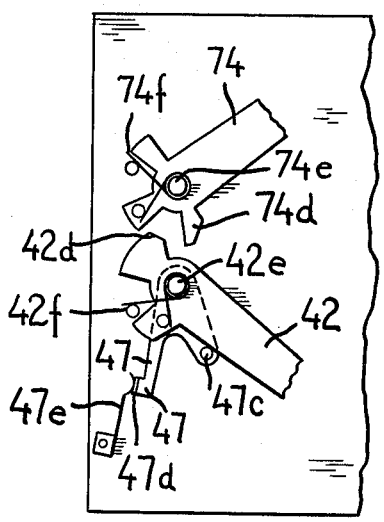
FIG. 4 is a plan view of a shutter in the state of opening, showing the second embodiment of the invention.

FIG. 4 shows the second embodiment, and shows the state where said shutter blades are open. In the drawing there is shown the contact state of a contact portion 47d of a contact member 47 with a contact plate 47e after an opening member 42 turns to the right by the action of a spring 42f to open a shutter blades and to push said pin 47c of said contact member 47, said opening and closing memnbers 42 and 47, respectively, being as shown in FIG. 4. When after the lapse of the desired exposure time said closing member 74 turns to the right by the action of said spring 74f, said shutter blades are closed to complete the exposure and then said projection 74d pushes said projection 42d to make said opening member turn to the left against said spring 42f so that said contact portion 47d comes out of contact with said contact piece 47e, resulting in the completed operation of said closing member 74.

Figure 5:
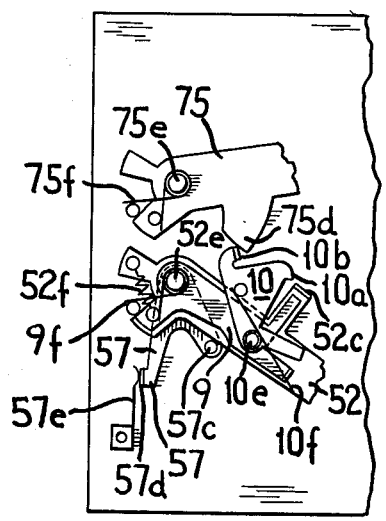
FIG. 5 is a plan view of another shutter in the state immediately after the exposure operation, showing the third embodiment of the invention.

FIG. 5 shows the third embodiment and shows the state immediately after the completion of an exposure operation. In the drawing, there is shown a state where a projection 75d pushes a bent portion 10b of a connecting member 10 to unlock an engaging portion 10a of said connecting member 10 from a bent portion 52c against a spring 10f, whereby said member 10 turns to the right to open said shutter blades and said closing member 75 further turns to the right by the action of a spring 75f to close them resulting in the completion of the exposure, the mechanism shown in FIG. 5 being composed in the same manner and having the same mode of operation as the mechanism described in earlier-filed U.S. Pat. application Ser. No. 708,026, now U.S. Pat. No. 4,054,891. By the action of a spring 52f, opening member 52 instantaneously turns to the left from the state shown in the drawing to release the pressure of a pin 57c so that said contact portion 57d comes out of contact with said contact plate 57e, resulting in the completion of the operation.

Figure 6:
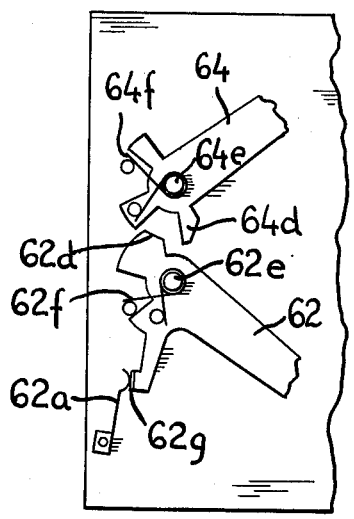
FIG. 6 is a plan view of a shutter in the state of opening, showing the fourth embodiment of the invention.

In FIG. 6, the arrangement is such that a contact portion 62g placed on an opening member 62 is equivalent to the FIG. 4 arrangement of said contact member 47 and said opening member 42 and the contact portion 62g comes into contact with an insulated contact plate 62a.

Figure 7:
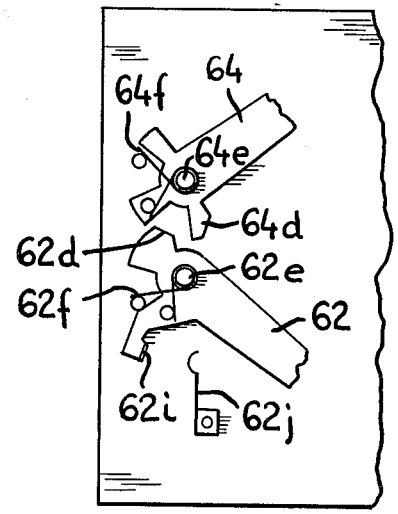
FIG. 7 is a plan view of a shutter in the state of opening, showing the fifth embodiment of the invention.

In FIG. 7, said contact plate 62a in the embodiment of FIG. 6 is arranged as a contact plate 62j so that it is conductive before the operation of said opening member 62 and is shifted to be nonconductive when said member 62 operates but returns again to the initial conductive state. Before the operation of said opening member 62, contact portion 62i and contact plate 62j are kept conductive, and when said opening member 62 starts to operate, they are shifted to be nonconductive as shown in FIG. 7. When said opening member 62 returns after the completion of the exposure operation, said contact portion 62i again comes into contact with said contact plate 62j to return the conductive state.

In connection with the opening operations of said opening members 2, 42, 52 and 62, as mentioned above, they are made to return to their respective states before operation by making said contact portions 7d, 47d, 57d and 62g come into contact with said contact plates 7e, 47e, 57e and 62h, respectively, or by making said contact portion 62i come out of contact with said contact plate 62j and when the operations of said closing members 4, 74, 75 and 64 are completed, by making said opening members 2, 42, 52 and 62, respectively, travel for resetting so as to interrupt said contact or making said contact portion 62i come into contact with said contact plate 62j.

Travelling of said opening member for the resetting operation is not limited to the heretofore disclosed techniques and it is possible to make said opening member travel for resetting if a spring operating said opening member is made to return its direction after the operation of said closing member to act thereon, as is disclosed in earlier-filed U.S. patent application Ser. No. 712,400; or to make the same if said spring operating said closing member acts on said opening member; or to make the same if when the operation of said closing member is inturrupted the inertial force acts said opening member.

Since in said embodiments respective the contacts are closed at positions corresponding to the completion of the operations of said opening members, it is preferable that they are flash tuning contacts such as Storobo etc. and if the shutter according to this invention is arranged so as to close its contact at a position where said opening member starts to operate, it is also possible to adopt a tuning contact for a flashing apparatus with a long delay time or a contact for supplying electric power to the electronic shutter.

If the contact for supplying electric power is adopted it is necessary to make its opening member travel for resetting to the initial position, in the case of the embodiment shown it is possible to interrupt the travelling for resetting once said contact comes out of contact.

In this specification, each contact member is arranged so that it is shifted from nonconductive to conductive states but an arrangement wherein a contact member is shifted from conductive to nonconductive states is also possible.

The travelling for resetting, after the completion of the exposure operation, of said opening member results in such advantages as the shutter blades having an improved light-shielding ability, reexposure can be prevented, shutter size can be reduced, etc..

It can thus be seen that the present invention makes it possible to complete the opening and closing operations of a contact member by connecting the opening and closing members only in a shutter where the exposure is finished through consecutive operations of the opening and closing members, and since the contact arrangement is extremely simplified and the connection with said closing member is unnecessary in comparison with the conventional opening and closing system of contact by means of connection of said contact member with both said opening and closing members, the degree of freedom in arrangement of said contact member is increased and as a result the size reduction of the shutter and stabilization of contact performance can be realized.

What is claimed is:

1. In a camera shutter mechanism having a shutter aperture, an opening member mounted to undergo movement from an initial position to an open position in which said shutter aperture is open and back to its initial position and being normally biased for movement to said open position, and a closing member mounted to undergo movement from an initial position to a closed position in which said shutter aperture is closed and back to its initial position and being normally biased for movement to said closed position: two contact members normally biased into an initial state; means for moving one of said contact members from its initial state into or out of electrical contact with the other of said contact members only when said opening member is moved into its open position and for returning said one contact member to its initial state in response to movement of said opening member back to its initial position; and means for effecting movement of said opening member from its open position back to its initial position during the course of movement of said closing member into its closed position.

2. A camera shutter mechanism according to claim 1; wherein said means for moving and returning said one contact member comprises means on said opening member for releasably engaging with said one contact member during the course of movement of said opening member into its open position to accordingly move said one contact member and for disengaging from said one contact member during movement of said opening member back to its initial position.

3. A camera shutter mechanism according to claim 2; wherein said means for effecting movement of said opening member back to its initial position comprises means actuated during the course of movement of said closing member to its closed position for overriding the normal bias of said opening member to its open position to return said opening member back to its initial position.

4. A camera shutter mechanism according to claim 3; wherein said means for overriding the normal bias of said opening member comprises a pivotable and slidable actuating member having a first portion engageable with said opening member when said opening member is in its open position and having a locking portion releasably engageable with a projection and being biased for sliding movement by a spring and having a second portion engageable with said closing member during the course of movement thereof to its closed position to thereby pivot said actuating member out of locking engagement with said projection thereby enabling said spring bias to slide said actuating member against the normal bias of said opening member to accordingly return said opening member to its initial position.

5. A camera shutter mechanism according to claim 1; wherein said means for effecting movement of said opening member back to its initial position comprises means actuated during the course of movement of said closing member to its closed position for overriding the normal bias of said opening member to its open position to return said opening member back to its initial position.

6. A camera shutter mechanism according to claim 5; wherein said means for overriding the normal bias of said opening member comprises a pivotable and slidable actuating member having a first portion engageable with said opening member when said opening member is in its open position and having a locking portion releasably engageable with a projection and being biased for sliding movement by a spring and having a second portion engageable with said closing member during the course of movement thereof to its closed position to thereby pivot said actuating member out of locking engagement with said projection thereby enabling said spring bias to slide said actuating member against the normal bias of said opening member to accordingly return said opening member to its initial position.

* * * * *